United States Patent
Park et al.

(10) Patent No.: US 8,005,500 B2
(45) Date of Patent: Aug. 23, 2011

(54) MOBILE COMMUNICATIONS TERMINAL PROVIDING MEMO FUNCTION AND METHOD THEREOF

(75) Inventors: Eun-Sue Park, Gyeonggi-Do (KR); Jee-Young Cheon, Daegu (KR); Yeon-Woo Park, Seoul (KR); Sang-Hyuck Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/502,549

(22) Filed: Aug. 11, 2006

(65) Prior Publication Data

US 2007/0123300 A1 May 31, 2007

(30) Foreign Application Priority Data

Aug. 12, 2005 (KR) .................. 10-2005-0074194
Sep. 14, 2005 (KR) .................. 10-2005-0085945

(51) Int. Cl.
*H04M 1/00* (2006.01)
*H04B 1/38* (2006.01)
(52) U.S. Cl. .................... 455/550.1; 455/566
(58) Field of Classification Search .............. 455/414.1, 455/550.1, 566, 90.1; 382/187
See application file for complete search history.

(56) References Cited

U.S. PATENT DOCUMENTS

| | | | |
|---|---|---|---|
| 5,698,822 A * | 12/1997 | Haneda et al. ............ | 178/18.01 |
| 5,933,783 A * | 8/1999 | Kawakami et al. ........... | 455/566 |
| 5,943,055 A * | 8/1999 | Sylvan .......................... | 715/839 |
| 6,014,573 A | 1/2000 | Lehtonen et al. | |
| 6,256,009 B1 * | 7/2001 | Lui et al. ...................... | 345/684 |
| 6,295,372 B1 * | 9/2001 | Hawkins et al. ............. | 382/187 |
| 6,442,251 B1 * | 8/2002 | Maes et al. ................ | 379/93.23 |
| 6,527,464 B2 * | 3/2003 | Lee .................................. | 401/8 |
| 6,542,436 B1 * | 4/2003 | Myllyla ......................... | 367/95 |
| 6,662,244 B1 * | 12/2003 | Takahashi ....................... | 710/14 |
| 6,738,514 B1 * | 5/2004 | Shin et al. ...................... | 382/187 |
| 6,792,143 B1 * | 9/2004 | Harmovaara ................. | 382/189 |
| 6,853,710 B2 * | 2/2005 | Harris ....................... | 379/142.01 |
| 7,031,756 B1 * | 4/2006 | Sim et al. ....................... | 455/566 |
| 7,184,796 B2 * | 2/2007 | Karidis et al. ................ | 455/566 |
| 2002/0193152 A1 * | 12/2002 | Soini et al. .................... | 455/569 |
| 2003/0007018 A1 * | 1/2003 | Seni et al. ..................... | 345/864 |
| 2003/0016873 A1 * | 1/2003 | Nagel et al. ................... | 382/228 |
| 2003/0203746 A1 | 10/2003 | Iwase | |
| 2004/0049743 A1 | 3/2004 | Bogward | |
| 2004/0204140 A1 * | 10/2004 | Nagata .......................... | 455/566 |
| 2004/0209654 A1 | 10/2004 | Cheung et al. | |
| 2004/0263486 A1 * | 12/2004 | Seni ............................... | 345/173 |
| 2005/0169445 A1 * | 8/2005 | Harris ......................... | 379/88.19 |
| 2005/0227635 A1 * | 10/2005 | Hawkins et al. ............. | 455/90.3 |
| 2006/0068851 A1 * | 3/2006 | Ashman ........................ | 455/566 |

FOREIGN PATENT DOCUMENTS

| | | |
|---|---|---|
| CN | 1454026 A | 11/2003 |
| EP | 0 776 115 A2 | 5/1997 |
| GB | 2 337 891 A | 12/1999 |
| JP | 08-317041 | 11/1996 |

(Continued)

*Primary Examiner* — Lester Kincaid
*Assistant Examiner* — Nathan Mitchell
(74) *Attorney, Agent, or Firm* — Birch, Stewart, Kolasch & Birch, LLP

(57) ABSTRACT

A mobile communication terminal including a controller configured to activate both a speakerphone function and an additional function on the terminal when a functional key corresponding to the additional function is selected during an existing call, and an input unit configured to input information related to the additional function during the existing call.

6 Claims, 8 Drawing Sheets

FOREIGN PATENT DOCUMENTS

| | | |
|---|---|---|
| JP | 9-181801 A | 7/1997 |
| KR | 10-2000-0064186 A | 11/2000 |
| KR | 10-2003-0003628 | 1/2003 |
| KR | 10-2005-0055798 A | 6/2005 |

* cited by examiner

MOBILE COMMUNICATIONS TERMINAL PROVIDING MEMO FUNCTION AND METHOD THEREOF

The present invention claims priority to Korean Application Nos. 10-2005-0074194 and 10-2005-0085945 filed in Korea on Aug. 12, 2005 and Sep. 14, 2005, respectively, the entire contents of both which are hereby incorporated by reference in their entirety.

BACKGROUND OF THE INVENTION

1. Field of the Invention

The present invention relates to a mobile communication terminal and corresponding method.

2. Background of the Invention

A mobile terminal allows a user to wirelessly call another party and also provides additional functions such as a camera function, an MP3 function, a scheduling function, a memo function, etc. Thus, the user is able to perform a variety of functions using his or her mobile terminal.

For example, the user can create a memo or note using different menu options provided on the terminal. Thus, if the user is currently speaking with another party and wants to create a memo (e.g., about where the user is to meet the other party), the user selects a memo function provided on the terminal. In this example, the user listens to what the other party is saying, puts down the terminal, enters the memo function on the terminal and inputs from his or her memory what the other party said.

When the user has finished creating the memo, the user can select an End Key, for example, to return back to the call with the other party. However, this is inconvenient for the user, because the user can generally only remember three or four words the other party spoke, and thus has to keep repeating the process of listening to the other party, writing down a portion of the memo, listening again to the other party, etc.

SUMMARY OF THE INVENTION

Accordingly, one object of the present invention is to address the above-noted and other problems.

Another object of the present invention is to provide a memo function that can be simultaneously performed while the user is speaking with another party.

To achieve these and other advantages and in accordance with the purpose of the present invention, as embodied and broadly described herein, the present invention provides in one aspect a mobile communication terminal including a controller configured to activate both a speakerphone function and an additional function on the terminal when a functional key corresponding to the additional function is selected during an existing call, and an input unit configured to input information related to the additional function during the existing call.

In another aspect, the present invention provides a mobile communication method, which includes activating both a speakerphone function and an additional function on a mobile terminal when a functional key corresponding to the additional function is selected during an existing call, and inputting information related to the additional function during the existing call.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 1:
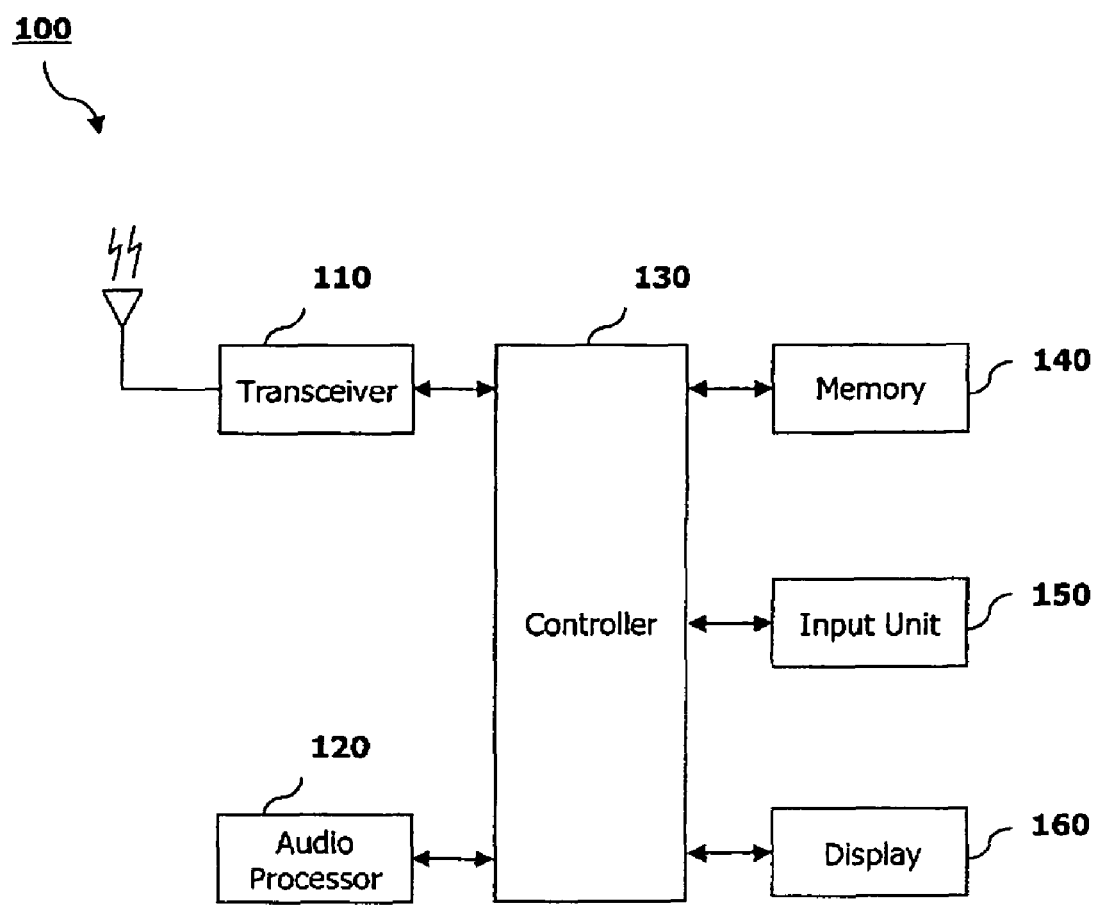
FIG. 1 is a block diagram illustrating a mobile communication terminal providing a memo function in accordance with a first embodiment of the present invention.

Turning first to FIG. 1, which is a block diagram illustrating a mobile terminal 100 that provides a memo function in accordance with a first embodiment of the present invention. As shown, the mobile terminal 100 includes a transceiver 110, an audio processor 120, a controller 130, a memory 140, an input unit 150 and a display 160.

As will be discussed in more detail below, the controller 130 determines whether a user has selected a memo function during a call state, and activates a speakerphone function when the user has selected the memo function. Further, the input unit 150 allows the user to input a memo, and the display 160 displays information to the user including the contents of the memo. Here, the input unit 150 may denote a key pad or a touch-type key pad. The touch-type key pad is a touch-sensitive display panel or touch screen, for example, that the user merely needs to touch with his or her finger, stylus, etc. to select a particular function. The touch-type key pad is different than a regular key pad in which the user must press (and not merely touch) a particular key.

Figure 2:
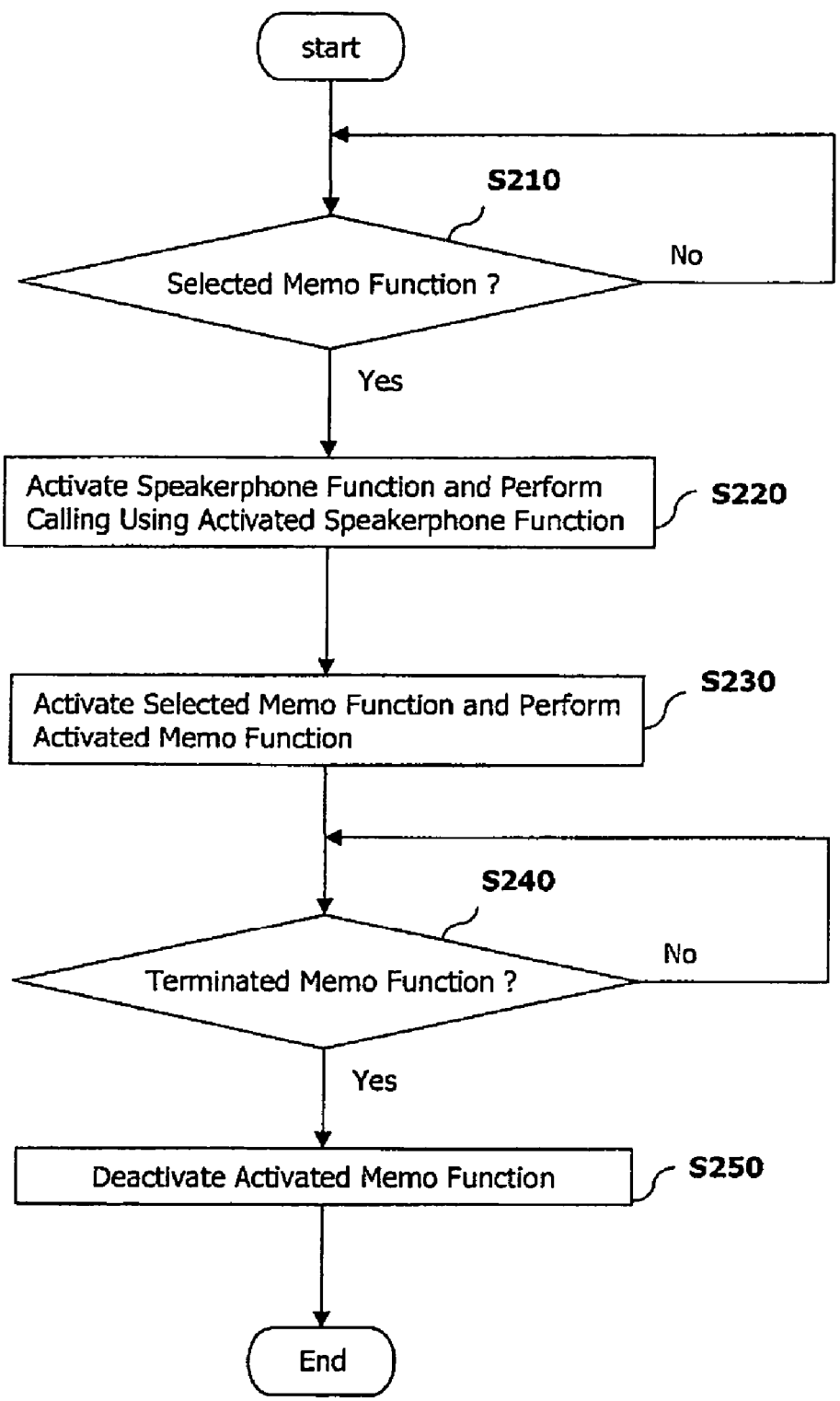
FIG. 2 is a flowchart illustrating a method for providing a memo function of the mobile terminal in accordance with the first embodiment of the present invention.

Turning next to FIG. 2, which is a flowchart illustrating a method for providing a memo function of a mobile in accordance with the first embodiment of the present invention. FIG. 1 will also be referred to in this description. As shown, the controller 130 first determines whether or not the user has selected a memo function during a call state (S210). If the user has selected a memo function during a call state (Yes in S210), the controller 130 activates a speakerphone function on the terminal such that the voice call is output through the speakerphone (S220).

The controller 130 also activates and performs the selected memo function (S230), and then determines whether or not the user has ended the memo function (S240). Thus, the user can create a memo using the input unit 150 and store the contents of the memo in the memory 140. As will be discussed in more detail later, the user can store the memo in different file formats.

Further, when the controller 130 determines the user has ended the memo function (Yes in S240), the controller 130 deactivates the memo function and speakerphone function (S250) and the call is output to the previous output state such as the earpiece of the terminal. Note that the speakerphone function does not necessarily have to be deactivated with the memo function (i.e., the user may want to continue speaking with the other party via the speakerphone).

In addition, the memo function refers to storing a recording voice, or inputting text, images, etc. In addition, the mobile terminal 100 may also include a preset memo key that can be selected by the user to create a memo. Menu options may also be provided allowing the user to create a memo. The terminal may also include a speakerphone function key allowing the user to activate or deactivate the speakerphone function. Note that in the above example, the controller 130 automatically activates and deactivates the speakerphone function without the user's interaction.

The memo function may also include one or more sub memo functions. Thus, in this instance, when the user selects the memo function, the controller 130 activates the speakerphone function and then displays sub memo functions on the display 160. The user can then select a particular sub memo function such as "create memo," "name memo," etc.

Figure 3:
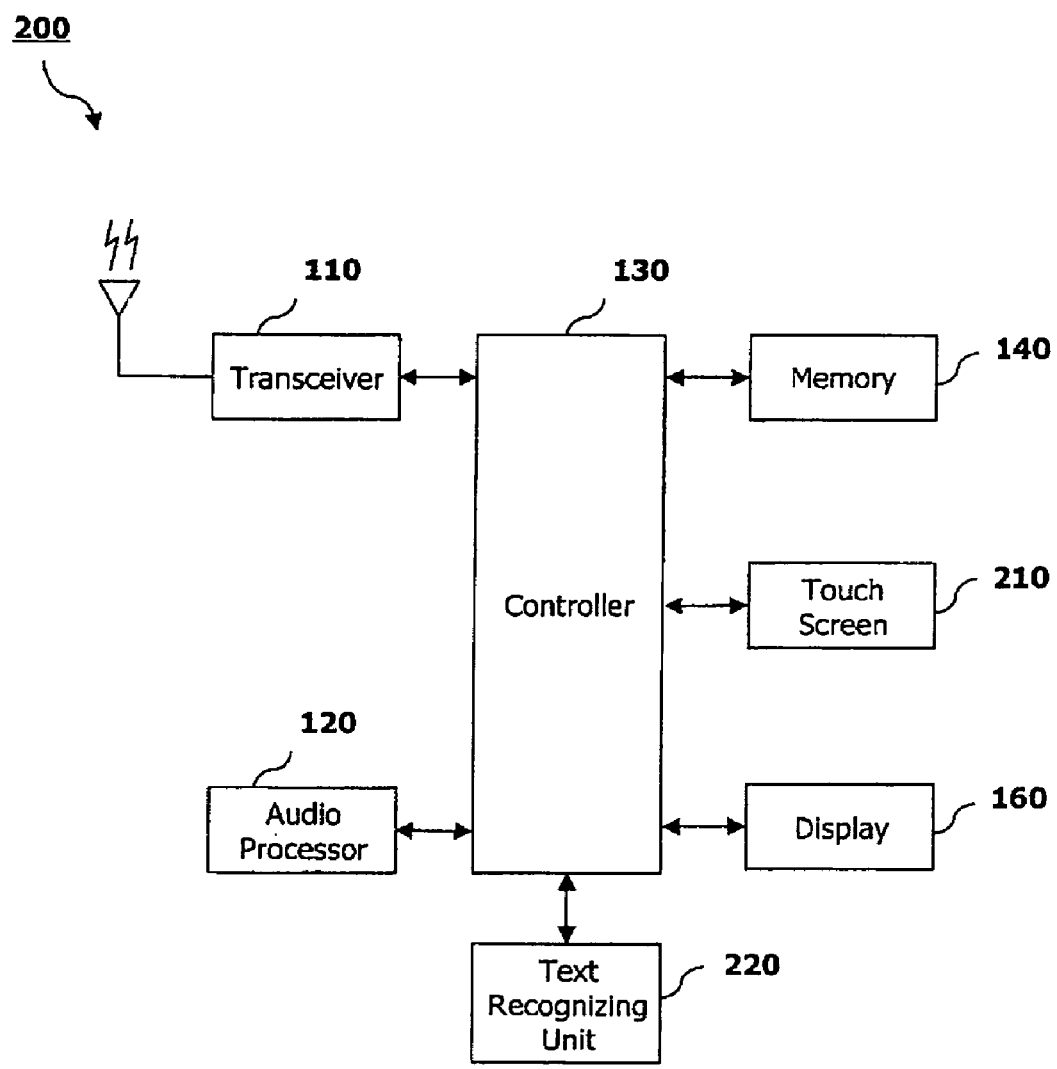
FIG. 3 is a block diagram illustrating a mobile terminal providing a memo function in accordance with a second embodiment of the present invention.

Turning next to FIG. 3, which is a block diagram of a mobile terminal 200 having a memo function in accordance with a second embodiment of the present invention. The mobile terminal in FIG. 3 is similar to the mobile terminal in FIG. 1, except the mobile terminal in FIG. 3 includes a touch screen 210 as the input unit and also includes a text recognizing unit 220. The other components are substantially the same as in FIG. 1 and thus a detailed description of these components is not repeated.

With reference to FIG. 3, the touch screen 210 allows the user to create a memo by simply touching or drawing on the touch screen 210. Further, the text recognizing unit 220 reads the contents of the memo input on the touch screen 210 such that the contents may be stored in the memory 140.

Turning now to FIGS. 4A-4D, which are overviews illustrating an operational principle for performing the memo function of the mobile terminal in accordance with the second embodiment of the present invention. FIG. 3 will also be referred to in this description.

Figure 4A:
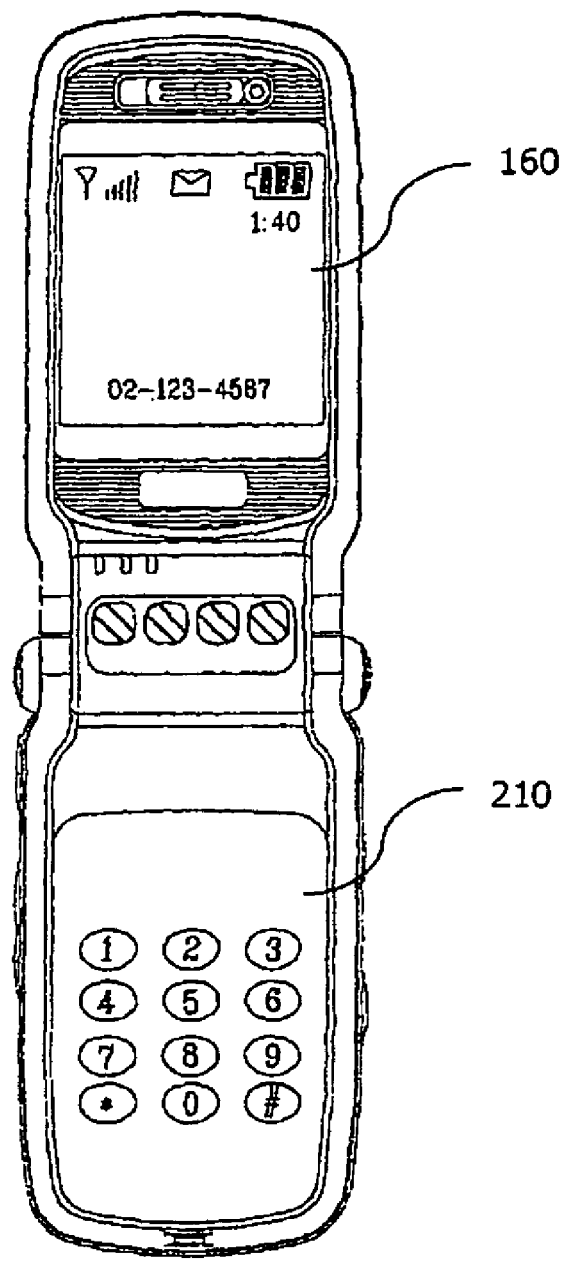
FIGS. 4A through 4D are overviews illustrating an operational principle for performing the memo function of the mobile terminal in accordance with the second embodiment of the present invention.
Figure 4B:
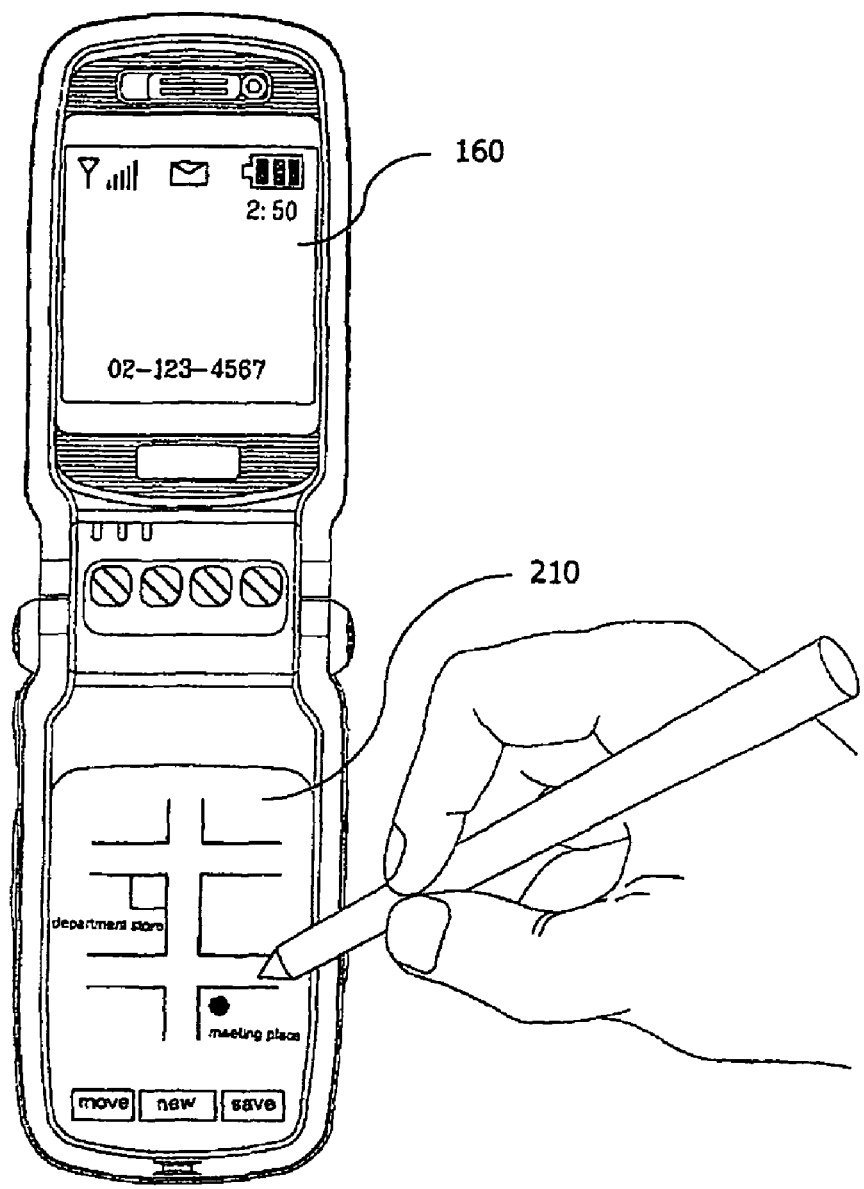

As illustrated in FIG. 4A, the touch screen 210 displays a key pad allowing the user to place or dial a call. In addition, while the user is speaking with the other party via an earpiece, for example, the user can activate a memo function by selecting a menu, a memo function key, or by touching the touch screen 210 using a finger or a pen, for example. In more detail, FIG. 4B illustrates an activated memo function. As shown in FIG. 4B, the previously displayed key pad disappears from the touch screen 210, and the user is provided with a screen to input a memo. In addition, as discussed above with respect to the first embodiment, the controller 130 switches the voice call being output through the earpiece to the speakerphone so that the user can simultaneously communicate with the other party and create the memo. In addition, the user can input text, pictures, voice recordings, etc. when creating the memo.

Figure 4C:
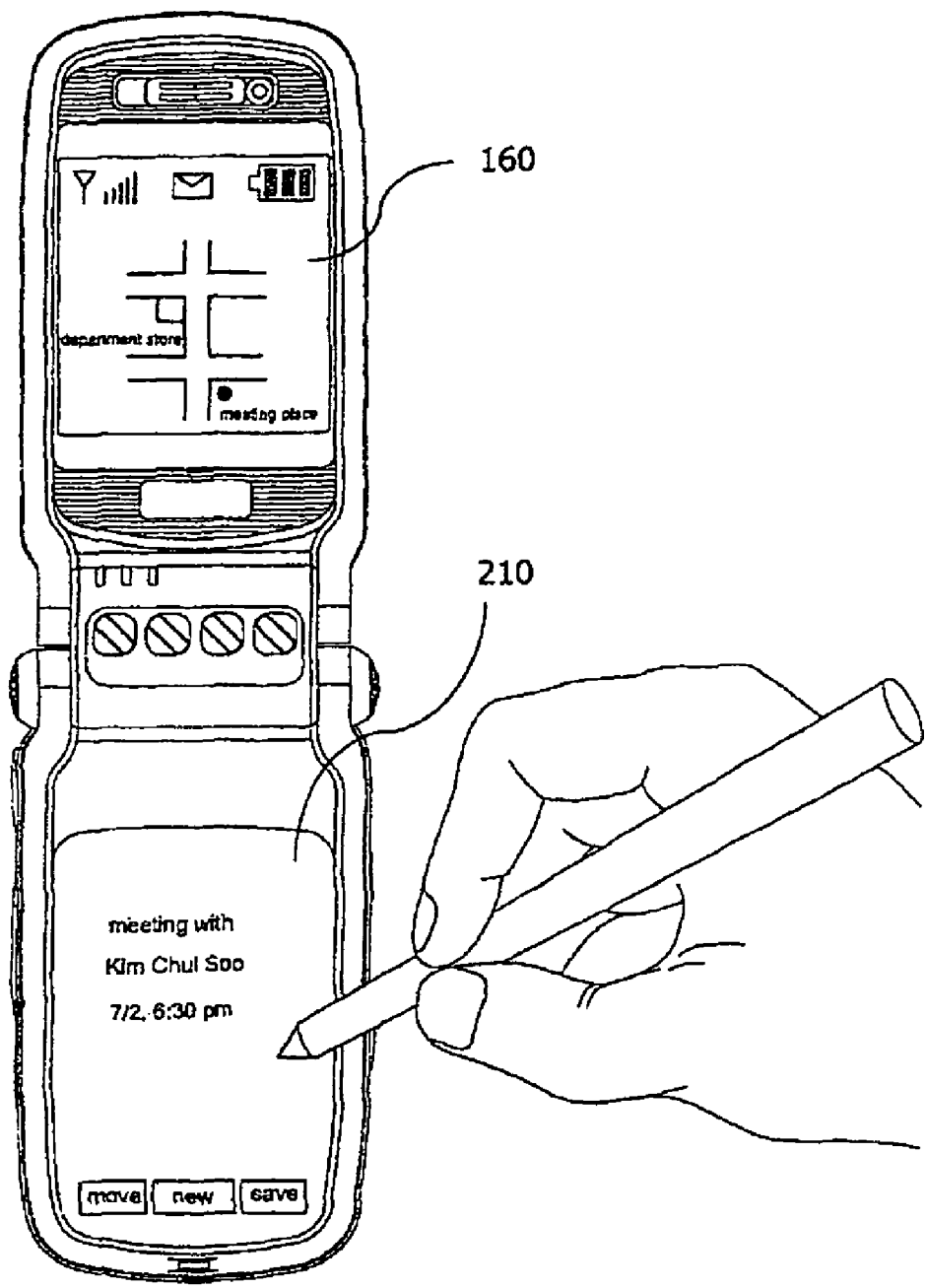

Turning next to FIG. 4C, which is an overview illustrating the memo input on the touch screen 210 being transferred to the display 160. That is, when the capacity of the memo exceeds a predetermined capacity, the input memo is moved from the touch screen 210 to the display 160, and the user is provided with a clean slate on the touch screen 210. The user may also manually have an input memo transferred to the display 160 by selecting a menu option or predetermined button or key on the terminal. For example, as shown in FIG. 4C, the touch screen 210 includes a "Move" button that the user may select to move the contents of the memo from the touch screen 210 to the display 160.

Figure 4D:
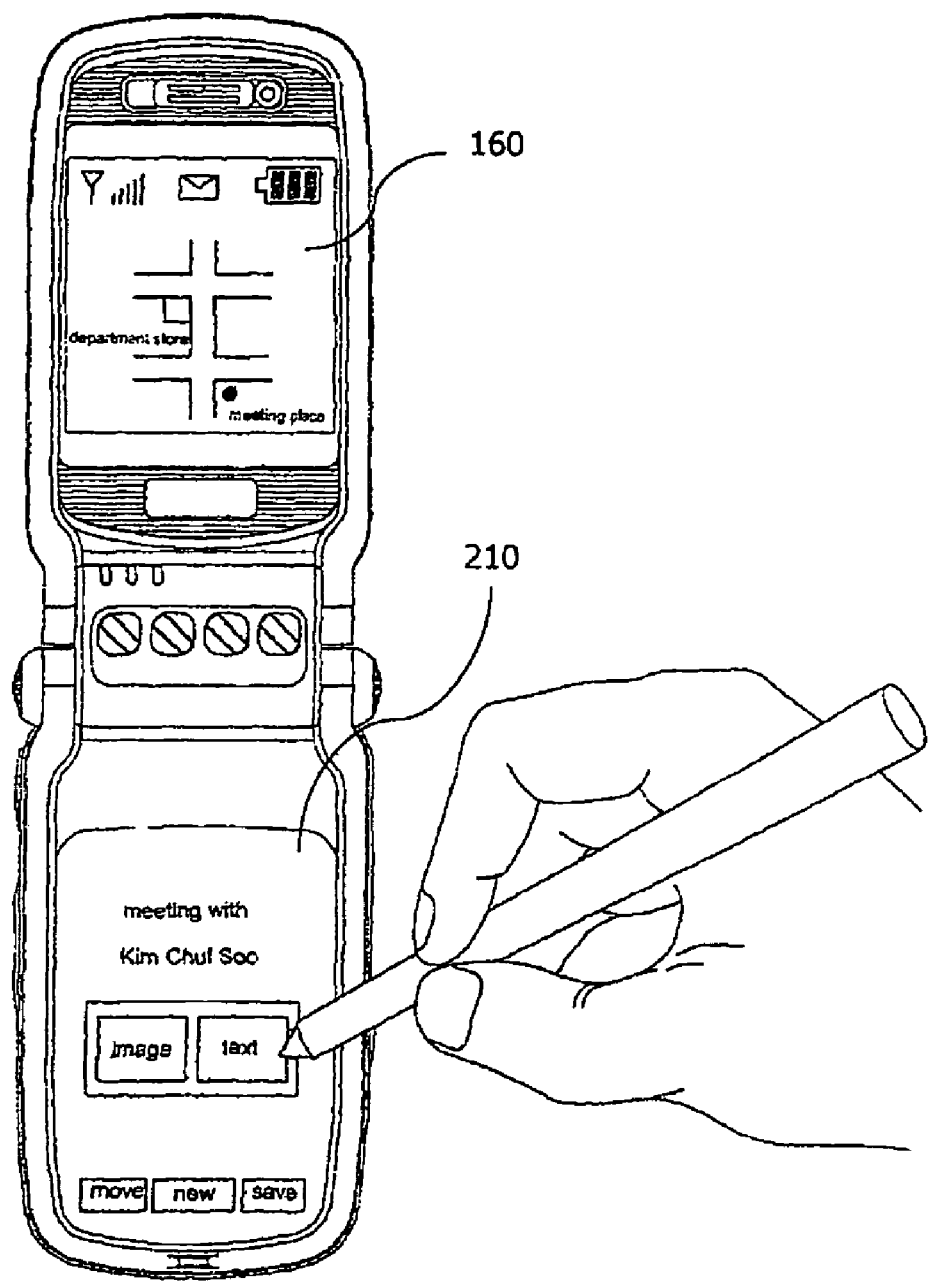

Next, FIG. 4D is an overview illustrating how the user can save the contents of the memo. In more detail, the user first selects the "Save" button displayed on the touch screen 210. Then the user is prompted with the options of saving the contents as an "image" or "text" file. The user can also start a new memo by selecting the "New" menu option on the touch screen 210.

Figure 5:
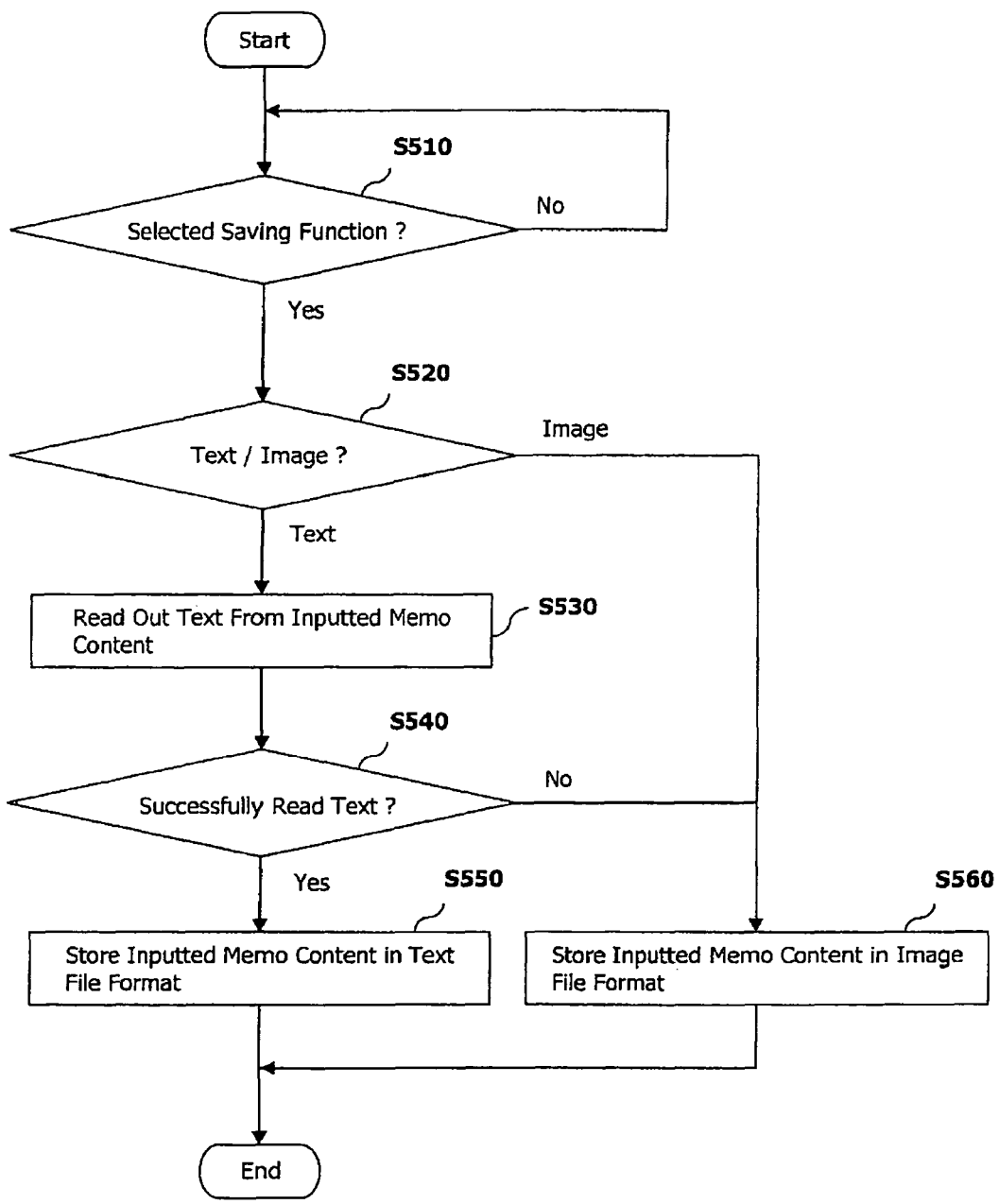
FIG. 5 a flowchart illustrating a method for storing a memo created on the mobile terminal in accordance with the second embodiment of the present invention.

Turning next to FIG. 5, which is a flowchart illustrating a method for storing (saving) a created memo in accordance with the second embodiment of the present invention. Note the controller 130 in FIG. 1 performs the saving function in concert with the memory 140, input unit 150, display unit 160 and text recognizing unit 220. As shown in FIG. 5, the method first determines whether or not the user has selected the "Save" option on the touch screen 210 (S510). If the user has selected the "Save" option (Yes in S510), the method prompts the user asking if they want to save the memo as a "text" or "image" file (S520).

If the user selects the "text" option, the text recognizing unit 220 reads the contents of the memo from the touch screen 210 (S530), and the method then determines if the memo contents were read successfully (S540). When the text has been successfully read (Yes in S540), the method stores the memo content as the text file (S550). However, if the memo contents was not read successfully (No in S540), the memo contents is saved as an image file (S560), and the user is notified that the memo contents was not read successfully and thus was saved as an image file.

In addition, if in step S520, the user requests the file be saved as an image file, the method saves the file as an image (S560). Further, because a text file is generally smaller than an image file, the user may opt to store the file as a text file. Thus, in this instance, the user can store more memos.

Further, the above description describes simultaneously creating a memo (an additional service) and engaging in a call. However, the present invention may also be applied to other additional services such as (1) online services including online games, portable internet services, a Video On Demand (VOD) function, a file downloading function, etc., (2) various messaging functions including chatting, instant message, text message, multimedia message, email, etc., (3) communication functions including video communication, etc., (4) a camera function including capturing videos, capturing still images, etc., (5) and various additional functions including a scheduler, phone number search, calculator, call contents recording, terminal state setup, calendar search, world time check, alarm setup, playing back of videos and music files, etc. Thus, in accordance with the present invention, the user can simultaneous perform any one of the above functions while engaging in a conversation with another party.

In addition, the additional services including the memo function may be activated or deactivated by selecting a preset key or menu, for example. In other words, when the preset key or menu is selected in a deactivated state of the additional service, the mobile terminal activates the speakerphone function and thereafter activates the additional service In addition, when the preset key or menu is selected in an activated state of the additional service, the mobile terminal deactivates the additional service and thereafter deactivates the speakerphone function.

Thus, as described above, the user can perform an additional function such as creating a memo while simultaneously engaging in a call. This is particular advantageous because the user can perform several tasks simultaneously. For example, the user can advantageously create a memo during an existing call without having to enter several different commands. That is, the user can simply press a single key to automatically switch the existing call to the speakerphone and perform the memo function. In the background art, the user had to continuously switch back and forth between the memo function and the existing call to create a memo. The user can also automatically switch the existing call to the speakerphone and perform an additional service such as phone book search operation to simultaneously speak with the other party and search for a particular phone number the other party requested, for example.

In addition, in another embodiment, the controller provides the user with a menu option allowing the user to selectively set what additional function is activated with the speakerphone function. Thus, the user can advantageously link any additional service with the speakerphone function such that both the speakerphone function and the additional service is automatically activated simply be pressing a single key on the terminal.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A mobile communication terminal, comprising:
a first display including a touch screen and configured to receive touch inputs for inputting information on the mobile terminal;
a second display physically separated from the first display with a non-display portion between the first and second displays, said second display configured to display information;
a wireless communication unit configured to wirelessly communicate with at least one other terminal; and
a controller configured to:
display a touch keypad on the first display allowing a call be placed to the at least one other terminal,
control the wireless communication unit to call the at least one other terminal based on keys touched on the displayed keypad,
receive a memo input signal indicating an activation request of a memo function on the mobile terminal during the call placed to the at least one other terminal,
replace the displaying of the touch keypad with a clean slate allowing a memo to be touch input on the second display,
automatically activate a speakerphone function on the mobile terminal so voice included in the call is output via a speaker on the mobile terminal when the memo input signal is received, and to automatically deactivate the speakerphone function and output the voice included in the call via a previous output unit used before the speakerphone function when the memo function is completed, and
move information corresponding to the memo input on the first display to the second display when a move request is input on the terminal to provide a clean slate on the first display for touch-inputting additional information concerning the memo,
wherein the controller is further configured to provide a menu option allowing a user to selectively set at least one other function to be activated with the speakerphone function.

2. The mobile communication terminal of claim 1, wherein the memo function further comprises recording and storing a voice memo.

3. The mobile communication terminal of claim 1, wherein the at least one other function is one of a scheduler function, an email function, a text messaging function, a camera function, a search function, a video or audio function, and a downloading function.

4. A method of controlling a mobile communication terminal, the method comprising:
displaying a touch keypad on a first display including a touch screen and allowing a call be placed to the at least one other terminal;
controlling a wireless communication unit to call the at least one other terminal based on keys touched on the displayed keypad;
receiving a memo input signal indicating an activation request of a memo function on the mobile terminal during the call placed to the at least one other terminal;
replacing the displaying of the touch keypad with a clean slate allowing a memo to be touch input on the second display;
automatically activating a speakerphone function on the mobile terminal so voice included in the call is output via a speaker on the mobile terminal when the memo input signal is received, and automatically deactivating the speakerphone function and outputting the voice included in the call via a previous output unit used before the speakerphone function when the memo function is completed;
providing a menu option allowing a user to selectively set at least one other function to be activated with the speakerphone function; and
moving information corresponding to the memo input on the first display to the second display when a move request is input on the terminal to provide a clean slate on the first display for touch-inputting additional information concerning the memo,
wherein the second display is physically separated from the first display with a non-display portion between the first and second displays.

5. The method of claim 4, wherein the memo function further comprises recording and storing a voice memo.

6. The method of claim 4, wherein the at least one other function is one of a scheduler function, an email function, a text messaging function, a camera function, a search function, a video or audio function, and a downloading function.

* * * * *